(12) United States Patent
Fowers et al.

(10) Patent No.: US 11,556,764 B2
(45) Date of Patent: Jan. 17, 2023

(54) DERIVING A CONCORDANT SOFTWARE NEURAL NETWORK LAYER FROM A QUANTIZED FIRMWARE NEURAL NETWORK LAYER

(71) Applicant: Microsoft Technology Licensing, LLC, Redmond, WA (US)

(72) Inventors: Jeremy Fowers, Seattle, WA (US); Daniel Lo, Bothell, WA (US); Deeksha Dangwal, Santa Barbra, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 992 days.

(21) Appl. No.: 16/290,117

(22) Filed: Mar. 1, 2019

(65) Prior Publication Data

US 2020/0279153 A1 Sep. 3, 2020

(51) Int. Cl.
*G06N 3/063* (2006.01)
*G06F 9/30* (2018.01)
*G06F 17/16* (2006.01)

(52) U.S. Cl.
CPC .......... *G06N 3/063* (2013.01); *G06F 9/3001* (2013.01); *G06F 9/30036* (2013.01); *G06F 17/16* (2013.01)

(58) Field of Classification Search
CPC .... G06F 9/3001; G06F 9/30036; G06F 17/16; G06N 3/063
See application file for complete search history.

(56) References Cited

U.S. PATENT DOCUMENTS

2018/0046894 A1 2/2018 Yao

OTHER PUBLICATIONS

Zhao, Jiacheng, et al. "On retargeting the ai programming framework to new hardwares." IFIP International Conference on Network and Parallel Computing. Springer, Cham, 2018. (Year: 2018).*
Loroch, Dominik Marek, et al. "Tensorquant: A simulation toolbox for deep neural network quantization." Proceedings of the Machine Learning on HPC Environments. 2017. 1-8. (Year: 2017).*

(Continued)

*Primary Examiner* — Benjamin P Geib
(74) *Attorney, Agent, or Firm* — Ranjeev Singh; Singh Law, PLLC

(57) ABSTRACT

Systems and methods for deriving a concordant software neural network layer are provided. A method includes receiving first instructions configured to, using a neural network processor (NNP), process a first set of data corresponding to a neural network layer, where the NNP is configured to quantize the first set of the data to generate a set of quantized data and then perform matrix-vector multiply operations on the set of quantized data using a matrix-vector-multiplier incorporated within hardware associated with the NNP to generate a first set of results. The method further includes processing the first instructions to automatically generate second instructions configured for use with at least one processor, different from the NNP, such that the second instructions, when executed by the at least one processor to perform matrix multiply operations, generate a second set of results that are concordant with the first set of results.

20 Claims, 6 Drawing Sheets

(56) References Cited

OTHER PUBLICATIONS

Mendis, et al., "Helium: lifting high-performance stencil kernels from stripped x86 binaries to halide DSL code", In Proceedings of the 36th ACM SIGPLAN Conference on Programming Language Design and Implementation, Jun. 13, 2015, pp. 391-402.

Rajagopal, et al., "Synthesizing a protocol converter from executable protocol traces", In Journal of IEEE Transactions on Computers, vol. 40, Issue 4, Apr. 1991, pp. 487-499.

Ambrosi, et al., "Hardware-Software Co-Design for an Analog-Digital Accelerator for Machine Learning", In IEEE International Conference on Rebooting Computing (ICRC), Nov. 7, 2018, 13 Pages.

Ji, et al., "Bridging the Gap Between Neural Networks and Neuromorphic Hardware with A Neural Network Compiler", In Proceedings of the Twenty-Third International Conference on Architectural Support for Programming Languages and Operating Systems, Mar. 19, 2018, pp. 448-460.

Oh, Youngh. , "A Portable, Automatic Data Quantizer for Deep Neural Networks", In Proceedings of the 27th International Conference on Parallel Architectures and Compilation Techniques, Nov. 1, 2018, pp. 1-14.

"International Search Report and Written Opinion issued in PCT Patent Application No. PCT/US20/018930", dated Jun. 15, 2020, 14 Pages.

* cited by examiner

DERIVING A CONCORDANT SOFTWARE NEURAL NETWORK LAYER FROM A QUANTIZED FIRMWARE NEURAL NETWORK LAYER

BACKGROUND

Neural network technology is used to perform complex tasks such as image classification, reading comprehension, language translation, or speech recognition. Many of these tasks include deep learning that involves performing large numbers of floating point matrix multiply and accumulate operations. These operations are performed during training as well as during serving of results based on the input data and the trained data.

Neural networks may use values corresponding to the input data and the training data expressed in different formats, including data expressed in different levels of precision.

SUMMARY

In one example, the present disclosure relates to a method including receiving first instructions configured to, using a neural network processor, process a first set of data corresponding to a neural network layer, wherein the neural network processor is configured to quantize the first set of the data to generate a set of quantized data and then perform matrix-vector multiply operations on the set of quantized data using a matrix-vector-multiplier incorporated within hardware associated with the neural network processor to generate a first set of results. The method may further include processing the first instructions to automatically generate second instructions configured for use with at least one processor, different from the neural network processor, such that the second instructions, when executed by the at least one processor to perform matrix multiply operations corresponding to the neural network layer, generate a second set of results that are concordant with the first set of results.

In another example, the present disclosure relates to a system including at least one processor and a memory. The memory may include first instructions configured to, using the neural network processor a matrix-vector-multiplier incorporated within hardware associated with the neural network processor and a multi-function unit incorporated with the hardware associated with the neural network processor, process a first set of data corresponding to a neural network layer, wherein the neural network processor is configured to quantize the first set of data to generate a first set of quantized data and then: (1) perform matrix operations on the first set of quantized data, using the matrix-vector-multiplier incorporated within hardware associated with the neural network processor, to generate a first set of output data, (2) quantize the first set of output data to generate a first set of quantized output data, and (3) perform scalar operations, using the multi-function unit incorporated within the hardware associated with the neural network processor, on the first set of quantized output data to generate a second set of output data. The memory may further include second instructions configured to process the first instructions to generate third instructions configured for use with the at least one processor, different from the neural network processor, wherein the third instructions comprise instructions for performing matrix multiply operations and instructions for performing scalar operations to process the neural network layer.

In yet another example, the present disclosure relates to a non-transitory computer-readable medium including code corresponding to a method. The method may include receiving first instructions configured to, using a neural network processor, process a first set of data corresponding to a neural network layer, wherein the neural network processor is configured to quantize the first set of the data to generate a set of quantized data and then perform matrix-vector multiply operations on the set of quantized data using a matrix-vector-multiplier incorporated within hardware associated with the neural network processor to generate a first set of results. The method may further include processing the first instructions to automatically generate second instructions configured for use with at least one processor, different from the neural network processor, such that the second instructions, when executed by the at least one processor to perform matrix multiply operations corresponding to the neural network layer, generate a second set of results that are concordant with the first set of results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
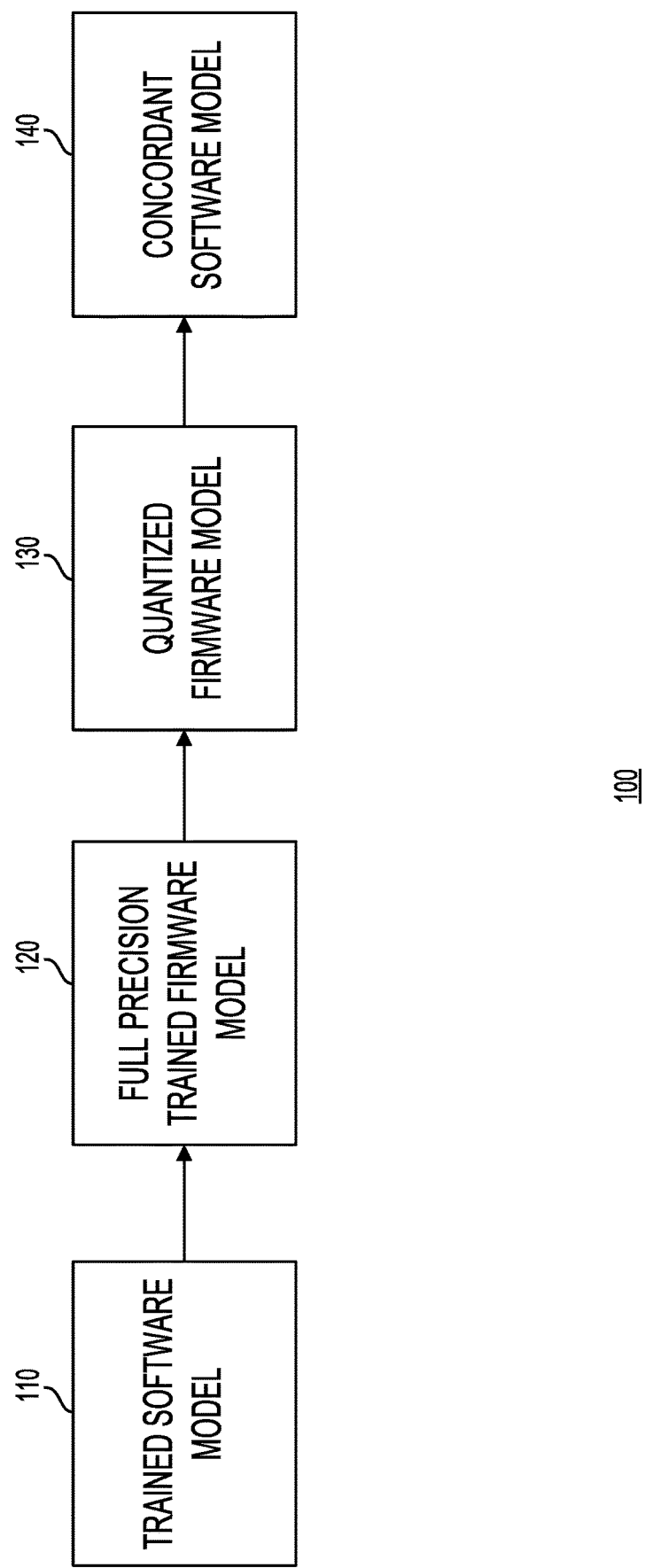
FIG. 1 is a block diagram of an environment for automatically generating a concordant trained software model in accordance with one example.

Examples disclosed in the present disclosure relate to systems, methods, and components for implementing neural network based processing. Certain examples relate to processing layers of Convolutional Neural Networks (CNNs) using quantization. Certain examples relate to processing layers of CNNs using a neural network processor. Certain examples relate to maintaining concordance between quantized firmware neural network layers and software neural network layers. A neural network processor may be implemented using any of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. Neural network processors may also be implemented using a CPU, a GPU, a combination of CPUs and GPUs, or a combination of any of the programmable hardware, CPUs, and GPUs. An image file may be used to configure or re-configure FPGAs. The image file or similar file or program may be delivered via a network link or a local link (e.g., PCIe) from a host CPU. Information included in an image file can be used to program hardware blocks of a node (e.g., logic blocks and reconfigurable interconnects of an FPGA) to implement desired functionality. Desired functionality can be implemented to support any service that can be offered via a combination of computing, networking, and storage resources, such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Long Short Term Memory (LSTM) neural networks, or Gated Recurrent Units (GRUs) may be implemented using the systems and nodes described in this disclosure. In one example, the service-related content or other information such as words, sentences, images, videos, or other such content/information may be translated into a vector representation.

In one example, the neural network model may comprise of many layers and each layer may be encoded as matrices or vectors of weights expressed in the form of coefficients or constants that have been obtained via training of a neural network. GPUs or programmable hardware logic blocks in the nodes may process the matrices or vectors to perform various operations, including multiply, add, and other operations against input vectors representing encoded information related to the service.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$i_t = \sigma(W_{xi}x_t + W_{hi}h_{t-1} + W_{ci}c_{t-1} + b_i)$ $f_t = \sigma(W_{xf}x_t + W_{hf}h_{t-1} + W_{cf}c_{t-1} + b_f)$ $c_t = f_t c_{t-1} i_t \tan h(W_{xc}x_t + W_{hc}h_{t-1} + b_c)$ $o_t = \sigma(W_{xo}x_t + W_{ho}h_{t-1} + W_{co}c_t + b_o)$ $h_t = o_t \tan h(c_t)$ In this example, inside each LSTM layer the inputs and hidden states may be processed using a combination of vector operations (e.g., dot-product, inner product, or vector addition) and non-linear functions (e.g., sigmoids, hyperbolic and tangents). In certain cases, the most compute intensive operations may arise from the dot products, which may be implemented using dense matrix-vector and matrix-matrix multiplication routines. In one example, the processing of the vector operations and non-linear functions may be performed in parallel.

Values corresponding to the training data, including vector data, may be represented in a number format. Floating point representation for the values of the vector data is expensive because each individual point value has an exponent specific to that point value. The alternative may be a fixed point representation. Performance, energy usage, and storage requirements can be improved through the use of reduced precision formats to implement artificial neural networks. Such formats can represent floating point numbers using a small (e.g. 3, 4, or 5-bit) mantissa and an exponent shared by two or more floating point numbers. Neural networks that use reduced precision formats may be referred to as quantized neural networks.

In one example, fixed point representation may use a set number of integer bits and fractional bits to express numbers. Fixed point can be efficiently processed in hardware with integer arithmetic, which may make it a preferred format when applicable. Fixed point format may be represented as qX·Y, where X is the number of integer bits and Y is the number of fractional bits. Block-floating point (BFP) may apply a shared exponent to a block of fixed point numbers; for example, a vector or matrix. The shared exponent may allow a significantly higher dynamic range for the block, although individual block members have a fixed range with respect to each other.

Quantized neural networks can improve the latency and throughput of running neural networks by reducing computation and memory demands. The use of reduced precision formats (e.g., any of a reduced precision floating point format, the Block Floating Point (BFP), or integers), however, can create issues when training neural networks. Parameters that may be suitable at the beginning of training may become suboptimal as the neural network converges. In addition, many neural network approaches typically use full precision floating point (e.g., 32-bit or 16-bit floating point numbers). As an example, certain software implementations of neural networks may use full precision floating point numbers. On the other hand, certain hardware implementations of neural networks may use reduced precision numbers. Because underlying implementations of software and hardware-accelerated neural networks are different, small differences in calculations can arise that can cause errors over time.

The core of many neural network algorithms is a matrix multiplication operation: $y = xW$, where x are input activations and W is a weight matrix. In one example, quantization is applied to the input activations and the weight matrix to reduce the hardware costs of computing the matrix multiplication. Thus, the matrix multiplication operation may be $y = Q(x)Q(W)$. With the unquantized matrix multiplication $$y = \alpha\left(x\frac{W}{\alpha}\right),$$

the arbitrary scalar values may be factored out without affecting the result. However, if quantization is applied to this form, then the result of the quantized matrix multiplication $$y = \alpha Q(x) Q\left(\frac{W}{\alpha}\right)$$

is affected in two ways. First, the weight values that are quantized are different, and thus they may lead to a different set of quantized points. Second, the high-precision scalar multiply after the matrix multiplication may also change the results.

Quantized data—for example, data in block floating point formats (e.g., with reduced sized mantissas and/or shared exponents)—can be used to represent weights or activation values in both software or hardware/firmware (e.g., an FPGA implementation) implementations of neural network models. Because the underlying algorithms differ between implementations, simulated results vary from actual results in the hardware/firmware implementations. Certain disclosed examples relate to generating consistent results for neural networks implemented using software that use quantized data with neural networks implemented using hardware/firmware that also use quantized data. One example of the disclosed technology provides a software implementation that matches the actual operations performed on hardware/firmware. Consequently, the software and the hardware/firmware implementations may advantageously have the same results. In some examples, a software implementation that matches the actual operations performed in hardware/firmware is referred to as a concordant software implementation of the neural network model.

FIG. 1 is a block diagram of an environment 100 for automatically generating a concordant software model 140 in accordance with one example. In this example, a trained software model 110 may include instructions and other software used to express a neural network layer. As an example, trained software model 110 may include instructions that include computations (e.g., matrix multiplication, ReLU, softmax). These computations may be expressed in stateful dataflow graphs using software, such as TensorFlow. Full precision trained firmware model 120 may refer to instructions and hardware/firmware implementation of a neural network model. In one example, the weights and the activation values corresponding to trained software model 110 and full precision trained firmware model 120 may be expressed in formats, such as floating point formats. In contrast, quantized firmware model 130 may refer to instructions and hardware/firmware implementation of a neural network layer using a neural network processor that uses quantized data, which may be expressed in a reduced precision format. In one example, the neural network processor may be configured to quantize the data to generate quantized data and then perform matrix operations on the quantized data using a matrix-vector-multiplier incorporated within hardware associated with the neural network processor. Additional details related to one implementation of a neural network processor that uses quantized data are provided with respect to FIG. 3. In one example, concordant software model 140 may include instructions configured to be processed by a compiler for execution using at least one processor, different from the neural network processor, such that despite using quantized data these instructions produce results that are concordant with the neural network model implemented using hardware/firmware.

Figure 2:
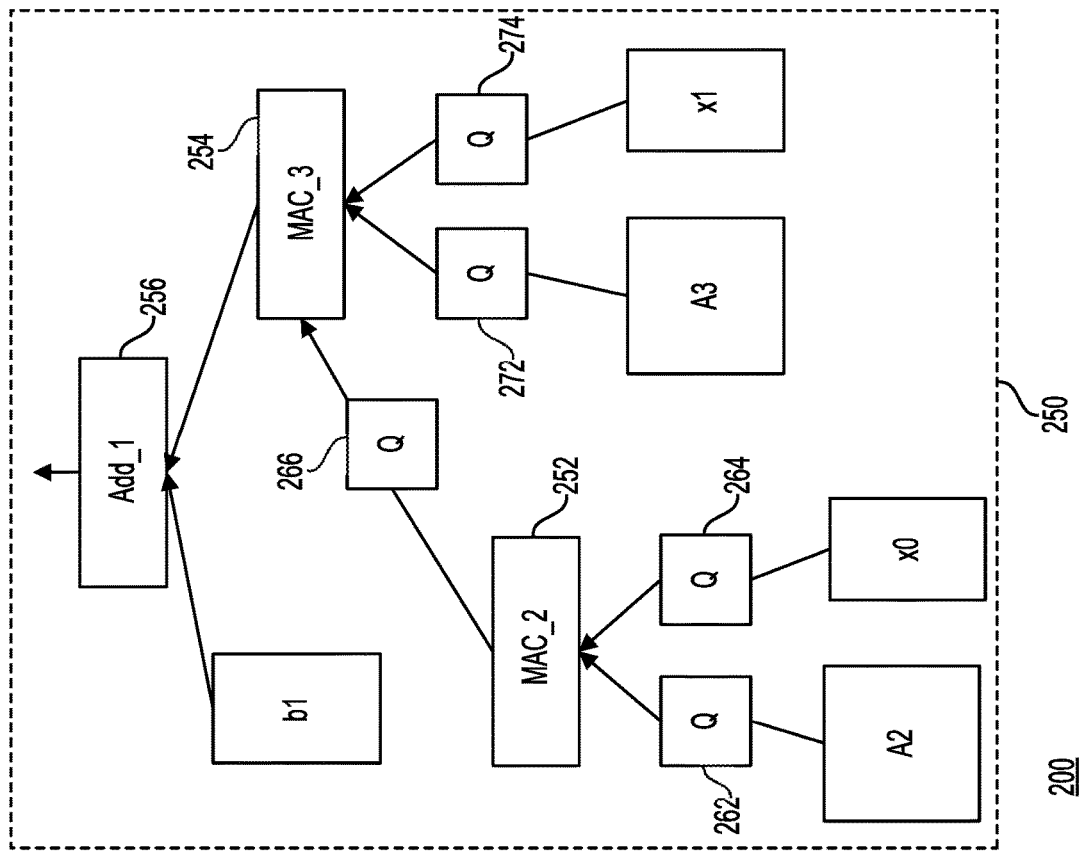
FIG. 2 is a block diagram of a portion of a quantized firmware neural network layer.
Figure 2:
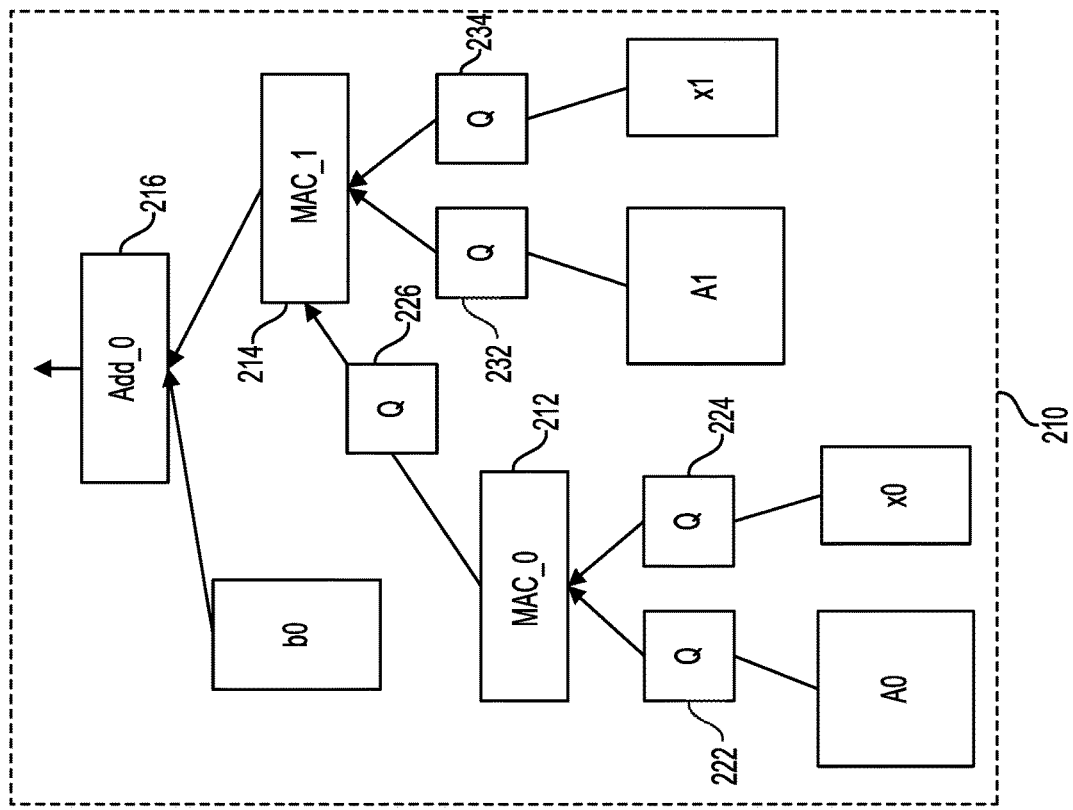

FIG. 2 is a block diagram of a portion of a quantized firmware neural network layer 200. This portion includes a neural network portion (NNP) 210 and another neural network portion (NNP) 250. NNP 210 shows operations that may be performed on weight values A0 and A1, input vector values x0 and x1, and bias vector values b0. In this example, weight values A0 and A1 may be stored in an N by N matrix, where N is a native dimension of a neural network processor (e.g., neural network processor 300 of FIG. 3) for use with quantized firmware neural network 200. Input values x0 and x1 may be stored in an N by 1 matrix. NNP 210 shows both multiply-and-accumulate (MAC_0 212 and MAC_1 214) operations and an add operation (Add_0 216). Weight values A0 and A1 may be quantized (Q 222 and Q 232, respectively) prior to the multiply-and-accumulate operations. Input values x0 and x1 may also be quantized (Q 224 and Q 234, respectively) prior to the multiply-and-accumulate operations. The output generated by the multiply-and-accumulate (MAC_0 212) operation may be quantized (Q 226).

With continued reference to FIG. 2, NNP 250 shows operations that may be performed on weight values A2 and A3, input vector values x0 and x1, and bias vector values b1. In this example, weight values A2 and A2 may also be stored in an N by N matrix, where N is the native dimension of the neural network processor for use with quantized firmware neural network 200. Input values x0 and x1 may also be stored in an N by 1 matrix. NNP 250 shows both multiply-and-accumulate (MAC_0 252 and MAC_1 254) operations and an add operation (Add_0 256). Weight values A2 and A3 may be quantized (Q 262 and Q 272, respectively) prior to the multiply-and-accumulate operations. Input values x0 and x1 may also be quantized (Q 264 and Q 274, respectively) prior to the multiply-and-accumulate operations. The output generated by the multiply-and-accumulate (MAC_0 252) operation may be quantized (Q266). Quantization may involve mapping continuous or high-precision values onto a discrete, low-precision grid. If the original points are close to their mapped quantization value, then one expects that the resulting computations will be close to the original computations. Quantization may be performed using logarithmic quantization. As explained earlier, conversion of values from a higher precision format to a lower precision format in the various ways noted earlier results in quantization. Although FIG. 2 shows a certain number of neural network portions, quantized firmware neural network layer 200 may include additional portions. In addition, although FIG. 2 shows certain values being quantized, additional values or fewer values may be quantized. As an example, although FIG. 2 shows that outputs of the multiply-and-accumulate (MAC_1 214 and MAC_3 254) are not quantized, they may be quantized.

Figure 3:
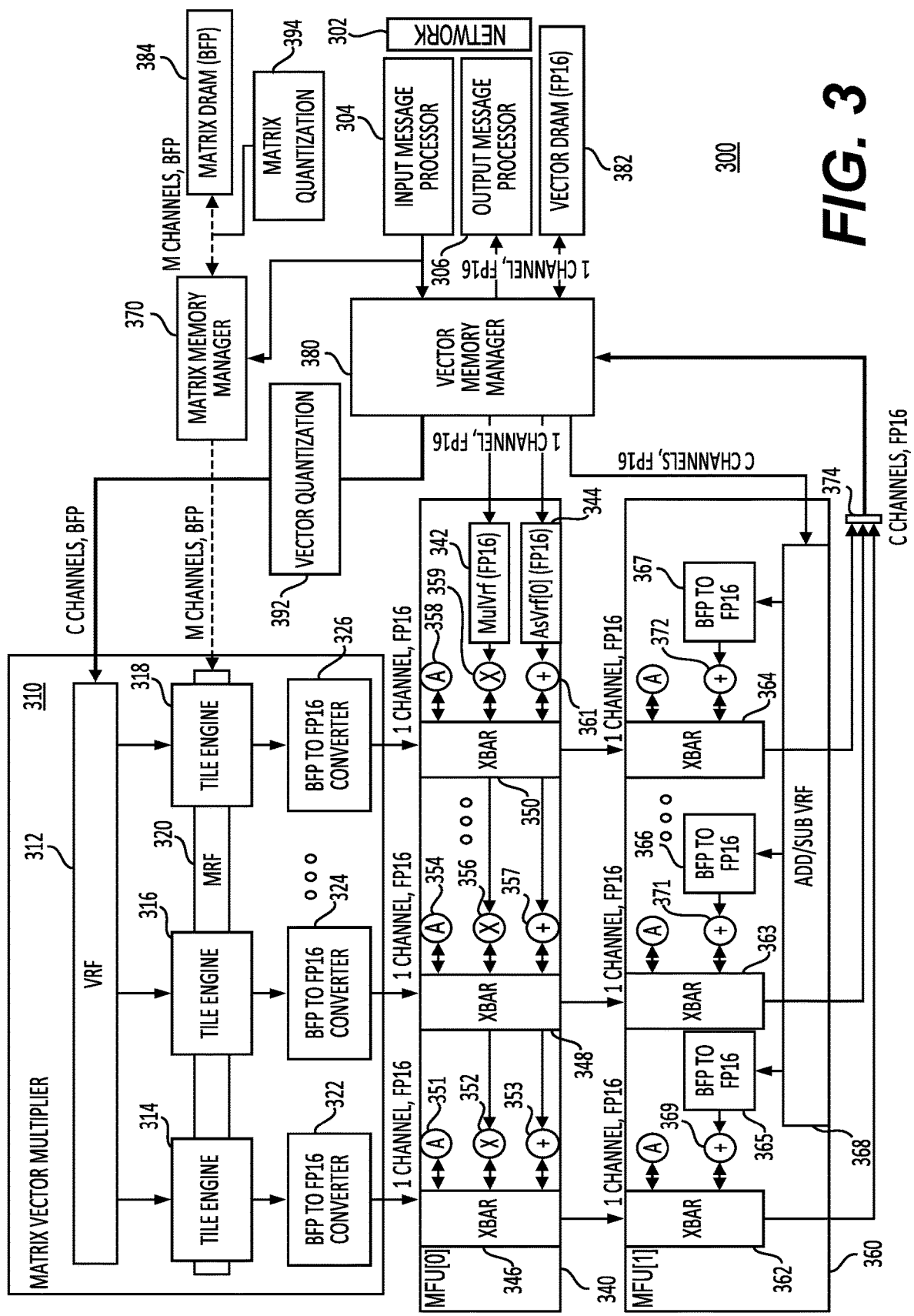
FIG. 3 is a block diagram of a neural network processor with quantization in accordance with one example.

FIG. 3 is a block diagram of a neural network processor 300 with quantization in accordance with one example. Each neural network processor 300 may include an Input Message Processor (IMP) 304 for receiving messages from other processors and an Output Message Processor (OMP) 306 for processing outgoing messages to other processors or components. Such messages may be received and transmitted via network 302. Each neural network processor 300 may further include a matrix vector multiplier (MVM) 310 and two or more multifunction units (MFUs) (e.g., MFU[0] 340 and MFU[1] 360). Each neural network processor 300 may further include a matrix memory manager 370, a vector memory manager 380, a Vector DRAM 382, and a Matrix DRAM 384. In this example, the processor may accept off-chip messages containing auxiliary information such as control and scalar data and payload data (e.g., vectors, matrices, or other tensor data structures). In this example, the incoming messages may be handled by a lightweight input message processor (IMP) 304, which sends the vectors to vector memory manager 380. IMP 304 may send the matrices to matrix memory manager 370.

Each of vector data (e.g., data corresponding to activations) and matrix data (e.g., data corresponding to weights) may be quantized using vector quantization 392 and matrix quantization 394, respectively. Thus, vector data received from vector memory manager 380 may be in a higher precision format (e.g., FP16 or FP32) and vector quantization 392 may convert the vector data from the higher precision format to a lower precision format (e.g., block floating point format). Similarly, matrix data received via network 302 or otherwise may be in a higher precision format (e.g., FP16 or FP32) and matrix quantization 394 may convert the matrix data from the higher precision format to a lower precision format (e.g., block floating point format). Because the matrix multiplication operations are more expensive in terms of resources and time, in one example, it may be advantageous to quantize only the inputs to MVM 310. Thus, in the example shown in FIG. 3, only the inputs to MVM 310 are being quantized. The inputs to the MFUs are not being scaled and quantized. Alternatively, in another example, inputs to both MVM 310 and the MFUs may be quantized.

With continued reference to FIG. 3, each of the matrices may have an N by N size and each of the vectors may have a size of 1 by N. In this example, all instructions corresponding to neural network processor 300 may operate on native-sized data. Logical vectors and matrices corresponding to the applications handled by neural network processor 300 may often be larger than the native size; in these cases, the vectors and matrices may be broken up into native-sized tiles. In one example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different. In one example, there may not be a need for the shared exponent. Instead, the weight values may be fixed to be within an integer range, e.g., $-2^b-1$ to $2^b-1$. This may further simplify the hardware used for performing the dot product operations.

Still referring to FIG. 3, MVM 310 may include a vector register file (VRF) 312, a matrix register file (MRF) 320, and tile engines (e.g., tile engines 314, 316, and 318). Tile engines may receive input matrix and input vector data from VRF 312. MVM 310 may further include precision format converters. In this example, a quantization operation can be performed for each tile. Thus, matrix quantization 394 may quantize weight values for each of tile engines 314, 316, and 318 in parallel. Similarly, vector quantization 392 may quantize activation or input values for each of tile engines 314, 316, and 318 in parallel. In one example, two internal BFP formats may be used by MVM 310 for expressing its input and output: BFP short, for vector and matrix storage, and BFP long for accumulation. In one example of MVM 310, BFP short may use q1.15 fixed point values with a shared 5 bit exponent, and BFP long may use q34.40 fixed point values with a shared 5 bit exponent. In this example, the matrix-vector multiplication may result in BFP long, which may be converted back to a floating-point format as a final output stage. Thus, the example MVM 310 shown in FIG. 3 may include BFP to FP16 Converters 322, 324, and 326 at the output stages. Tile engines 314, 316, and 318 may, in parallel, provide outputs to the respective converters as shown in the example in FIG. 3.

The matrix data may be communicated between Matrix DRAM 384 and Matrix Memory manager 370 using M number of channels. Vector memory manager 380 may move vector data over C number of channels.

With continued reference to FIG. 3, each MFU (e.g., MFU[0] 340 and MFU[1] 360) may include crossbars (e.g., crossbars labeled as xbars). MFU[0] 340 may support vector operations, such as vector-vector multiply and addition, a Sigmoid function, a Tan H function, a softmax operation, a Rectified Linear Unit (ReLU) operation, and/or an activation block operation. Thus, as shown in FIG. 3, MFU[0] 340 may include crossbars (e.g., xbar 346, 348, and 350) that may stream a vector from its input bus through a pipelined sequence of operations. Thus, a vector may be received via a register file labeled MulVrf 342 or another register file labeled AsVrf[0] 344, and such vectors may be subjected to any of a multiply operation, an addition operation, or some other operation. MFU[0] 340 may include several hardware blocks for performing addition (e.g., 353, 357, and 361). MFU[0] 340 may also include several hardware blocks for performing multiplication (e.g., 352, 356, and 359). MFU[0] 340 may also include several hardware blocks for performing activation (e.g., 351, 354, and 358).

Still referring to FIG. 3, MFU[1] 360 may include crossbars (e.g., xbar 362, 363, and 364) that may allow MFU[1] 360 to receive outputs from MFU[0] 340 and perform additional operations on those outputs and any additional inputs received via ADD/SUB VRF 368. MFU[1] 360 may include several hardware blocks for performing addition (e.g., 369, 371, and 372). MFU[1] 360 may also include several hardware blocks for performing activation. The outputs from MFU[1] 360 received via C channels may be coupled via a multiplexing circuit 374 to vector memory manager 380. Although FIG. 3 shows a certain number of components of neural network processor 300 arranged in a certain manner, there could be more or fewer number of components arranged differently.

Neural network processor 300 may be used to enable issuance of instructions that can trigger millions of operations using a small number of instructions. As an example, Table 1 below shows instructions corresponding to a fully parameterized LSTM:

TABLE 1

```
void LSTM (int steps) {
    for (int t = 0; t < steps; t++) {
        v_rd (5, NeqQ, DONTCARE) ;
        v_wr (5, InitialVrf, , 1stm → ivrf_xt) ;
        // xWF = xt * Wf + bf
        v_rd (s, InitialVrf, , 1stm → ivrf_xt);
        mv_mul (s , 1stm → mrf_Wf) ;
        vv_add (5, 1stm 4 asvrf_bf) ;
        v_wr (s , AddSubVrf, , 1stm 4 asvrf_xWf) ;
        II xWi = xt * Wi + bi ...
        // xWf = xt * Wo + bo ...
        // xWc = xt * Wc + bc ...
        // f gate 4 multiply by c_prev
        v_rd (5, InitialVrf , 1stm → ivrf_h_prev) ;
        mv_mul (5, 1stm → mrf_Uf) ;
        vv_add (s, 1stm → asvrf_xWf) ;
        v_sigm (s) , // ft
```

TABLE 1-continued

```
            vv_mul (s, 1stm → mulvrf_c_prev) ;
            v_wr (s , AddSubVrf, , 1stm → asvrf_ft_mod) ;
            // i gate ...
            // o gate ...
            // c gate → store ct and c_prev
            v_rd (s, InitialVrf , 1stm → ivrf_h_prev) ;
            mv_mul (s, 1stm → mrf_Uc) ;
            vv_add (s, 1stm → asvrf_xWc) ;
            v_tanh (s) ;
            vv_mul (s, 1stm → mulvrf_it) ;
            vv_add (s, 1stm → asvrf_ft_mod) ; // ct
            v_wr (s, MultiplyVrf, , 1stm → mulvrf_c_prev) ;
            v_wr (s, InitialVrf, , 1stm → ivrf_ct) ;
            // produce ht, store and send to network
            v_rd (s , InitialVrf , 1stm → ivrf_ct) ;
            v_tanh (s) ;
            vv_mul (s, 1stm 4 mulvrf_ot) ; // ht
            v_wr (s, InitialVrf, , 1stm 4 ivrf_h_prev) ,
            v_wr (s, NetQ , DONTCARE) ;
        }
    }
```

Although Table 1 shows a certain number of instructions having a certain format, neural network processor 300 may execute more or fewer instructions having a different format to accomplish the same objectives.

Table 2 below shows how to compute a 1×1 convolution as part of a CNN evaluation.

TABLE 2

```
SetIterations(bs, args->iterations),;
SetRowsCols(bs, 1, args->cols);
// Compute
v_rd_inc(bs, ISA_Mem_MvmInitialVrf, mvuivrf_input, args->cols);
mv_mul(bs, mrf_weights);
vv_add_inc(bs, ISA_Mem_AddSubVrf_0, asvrf0_bias, 0);
vv_add_inc(bs, ISA_Mem_AddSubVrf_1, asvrf1_residual, 1);
v_relu(bs);
v_wr_inc(bs, ISA_Mem_NetOutputQ, DONTCARE, DONTCARE).
```

As shown in the table above, the number of iterations over a chain of instructions for the computation may be specified. Next, as needed, the native dimension of each instruction chain may be scaled by a column scaling factor. And after reading the vector data from the vector register file it may be multiplied with the weights retrieved from the matrix register file. After performing additional operations as required by the CNN evaluation, the output may be provided. As an example, a pointwise Rectified Linear Unit (ReLU) operation may be performed for each element of the vector data.

Table 3 below shows how to compute an N×N convolution as part of a CNN evaluation. The instructions below that are similar to the 1×1 convolution are not described again. The Set2dWindows instruction may be used to set the total window size and then SetIterations instruction may be used to slide that window across the input volume. The *_inc instructions (e.g., v_rd_inc and v_add_inc) may be used to increment the instruction's address based on the stride. As an example, a stride of 2 may result in skipping of every other vector in the vector register file that is used to store vector data for operations, such as addition.

TABLE 3

```
SetRowsCols(bs, 1, args->windowCols * args->windowCols * args->volumeDepth);
Set2dWindow(bs, args->windowCols * args->volumeDepth, input_cols);
SetIterations(bs, output_cols);
```

TABLE 3-continued

```
for (unsigned imageRow = 0; imageRow < output_rows, imageRow++)
{
    for (unsigned filter = 0; filter < args->filterCount, filter++)
    {
        v_rd_inc(bs, ISA_Mem_MvmInitialVrf, ivrf_input + imageRow *
args->windowStride * input_cols, args->volumeDepth * args-
>windowStride);
        mv_mul(bs, mrf_weights + filter * args->windowCols* args-
>windowCols * args->volumeDepth);
        vv_add_inc(bs, ISA_Mem_AddSubVrf_0, asvrf0_bias + filter, 0);
        v_relu(bs);
        v_wr_inc(bs, ISA_Mem_Dram, dram_buffer wr ptr + filter,
output_depth);
    }
    dram_buffer_wr_ptr += output_cols * output_depth;
}
```

Although FIG. 3 shows a neural network processor with specific components, including matrix vector multipliers and multi-function units, the methods and concepts described herein could be included as part of other processors configured to perform operations related to the training of neural networks. As an example, any processor that is configured to perform operations, such as multiply-and-accumulate operations, addition operations, or other such operations may perform quantization and thus may require a system and related methods for generating concordant neural network instructions or operations.

Figure 4:
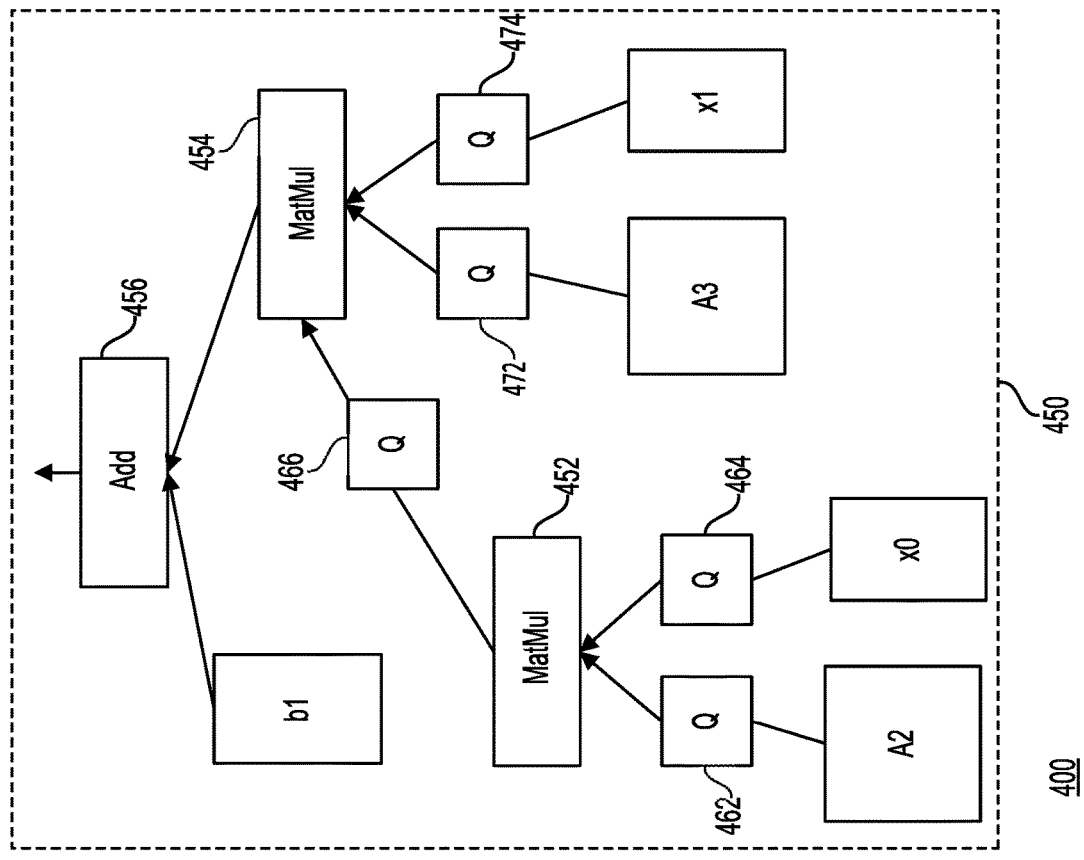
FIG. 4 is a block diagram of a portion of a quantized software neural network layer.
Figure 4:
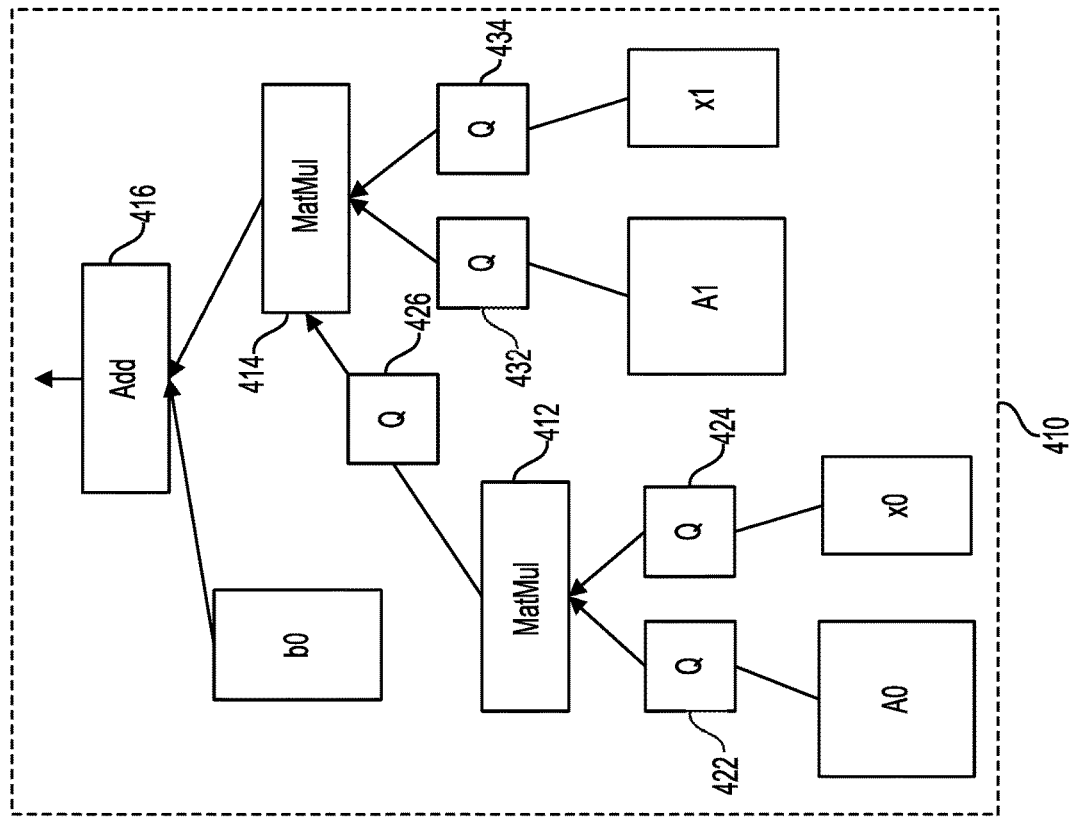

FIG. 4 is a block diagram of a portion of a quantized software neural network layer 400. This portion includes a neural network portion (NNP) 410 and another neural network portion (NNP) 450. NNP 410 shows operations that may be performed on weight values A0 and A1, input vector values x0 and x1, and bias vector values b0. NNP 410 shows both matrix multiplication (MatMul 412 and MatMul 414) operations and an add operation (Add 416). Weight values A0 and A1 may be quantized (Q 422 and Q 432, respectively) prior to the matrix multiply operations. Input values x0 and x1 may also be quantized (Q 424 and Q 434, respectively) prior to the matrix multiply operations. The output generated by the matrix multiply (MatMul 412) operation may be quantized (Q 426).

With continued reference to FIG. 4, NNP 450 shows operations that may be performed on weight values A2 and A3, input vector values x0 and x1, and bias vector values b1. NNP 450 shows both matrix multiply (MatMul 452 and MatMul 454) operations and an add operation (Add 456). Weight values A2 and A3 may be quantized (Q 462 and Q 472, respectively) prior to the matrix multiply operations. Input values x0 and x1 may also be quantized (Q 464 and Q 474, respectively) prior to the matrix multiply operations. The output generated by the matrix multiply (MatMul 452) operation may be quantized (Q 466). Quantization may involve mapping continuous or high-precision values onto a discrete, low-precision grid. If the original points are close to their mapped quantization value, then one expects that the resulting computations will be close to the original computations. Quantization may be performed using logarithmic quantization. As explained earlier, conversion of values from a higher precision format to a lower precision format in the various ways noted earlier results in quantization. Although FIG. 4 shows a certain number of neural network portions, the portion of quantized software neural network layer 400 may include additional portions. In addition, although FIG. 4 shows certain values being quantized, additional values or fewer values may be quantized. As an example, although FIG. 4 shows that outputs of the matrix multiply (MatMul 414 and MatMul 454) operations are not quantized, they may be quantized.

Figure 5:
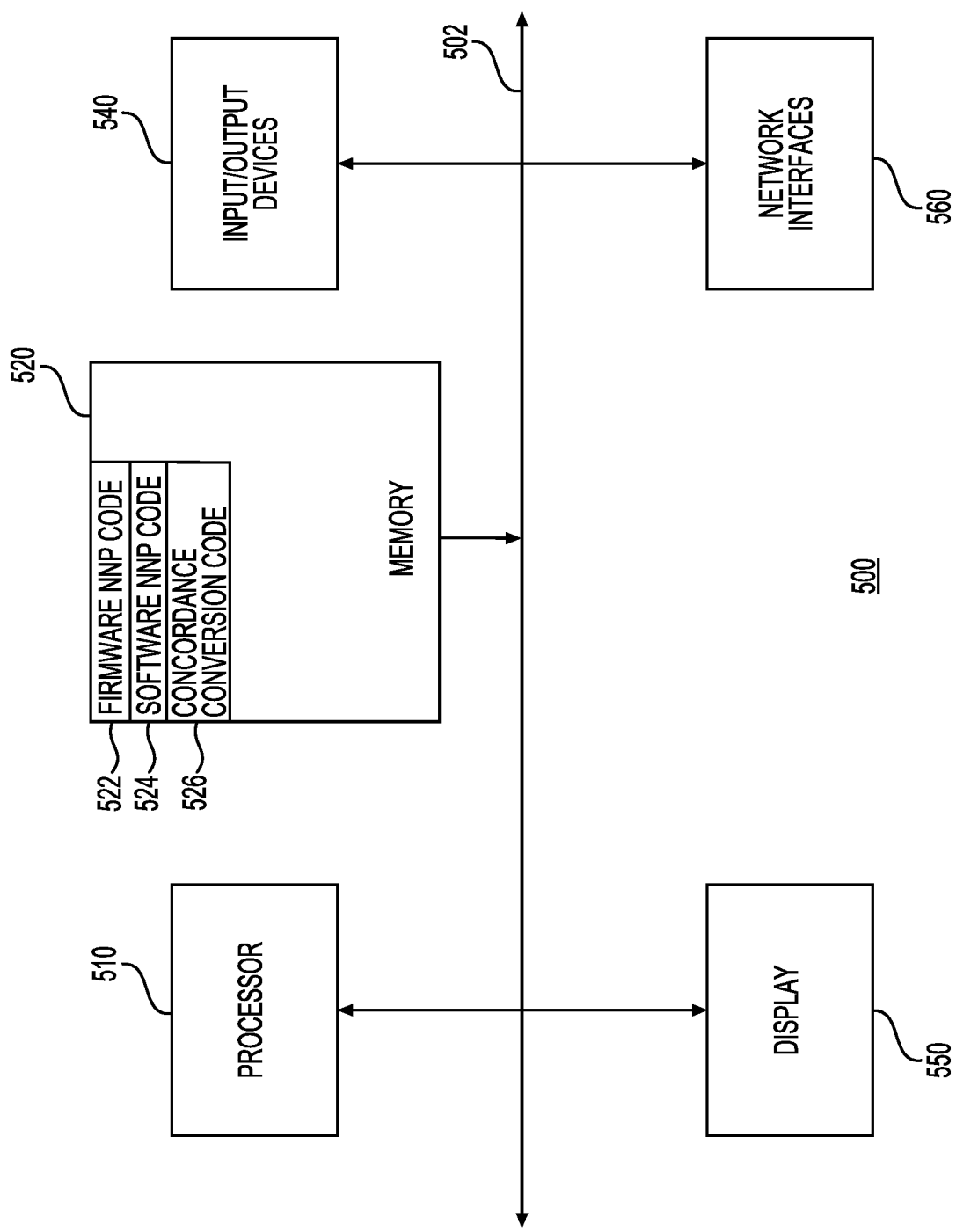
FIG. 5 is a block diagram of a system for automatically generating instructions corresponding to a concordant software neural network layer in accordance with one example.

FIG. 5 is a block diagram of a system 500 for automatically generating instructions corresponding to a concordant software neural network layer in accordance with one example. System 500 may include a processor 510, a memory 520, input/output devices 540, display 550, and network interfaces 560 interconnected via bus system 502. Memory 520 may include firmware neural network processing (NNP) code 522, software neural network processing (NNP) code 524, and concordance conversion code 526. Table 4 below shows instructions that may be part of firmware NNP code 522, configured to process data for the portions of the quantized firmware model shown in FIG. 2. In this example, these instructions include additional information than merely the instructions that may be executed by neural network processor 300. As an example, firmware NNP code 522 may include hints.

TABLE 4

```
// ISA_Index mrf = 0;
// ISA_Index ivrf = 0;
// const ISA_Index biasVrf = 0;
mrf = 0;
ivrf = 0;
biasVrf = 0;
hint(bias1)
SetCols(bs, args->hiddenDim1);
v_rd(bs, ISA_Mem_NetInputQ, DONTCARE);
v_wr_inc(bs, ISA_Mem_AddSubVrf_0, biasVrf);
hint(input1)
SetCols(bs, args->inDim);
v_rd(bs, ISA_Mem_NetInputQ, DONTCARE);
v_wr_inc(bs, ISA_Mem_MvmInitialVrf, ivrf, 1);
SetIterations(bs, args->hiddenDim1);
SetCols(bs, args->inDim);
v_rd(bs, ISA_Mem_MvmInitialVrf, ivrf);
mv_mul_inc(bs, 0, mrf, 0, args->inDim);
vv_add_inc(bs, ISA_Mem_AddSubVrf_0, biasVrf, 1);
v_relu(bs);
ivrf += args->inDim;
v_wr_inc(bs, ISA_Mem_MvmInitialVrf, ivrf, 1);
hint(bias2);
SetIterations(bs, 1);
SetCols(bs, args->hiddenDim1);
v_rd(bs, ISA_Mem_NetInputQ, DONTCARE);
v_wr(bs, ISA_Mem_AddSubVrf_0, biasVrf);
SetIterations(bs, args->hiddenDim1);
SetCols(bs, args->hiddenDim1);
v_rd(bs, ISA_Mem_MvmInitialVrf, ivrf);
mrf += args->hiddenDim1 * args->inDim;
mv_mul_inc(bs, 0, mrf, 0, args->hiddenDim1);
vv_add_inc(bs, ISA_Mem_AddSubVrf_0, biasVrf, 1);
v_relu(bs),
ivrf += args->hiddenDim1;
v_wr_inc(bs, ISA_Mem_MvmInitialVrf, ivrf, 1);
hint(bias3)
SetIterations(bs, 1);
SetCols(bs, args->outDim);
v_rd(bs, ISA_Mem_NetInputQ, DONTCARE);
v_wr_inc(bs, ISA_Mem_AddSubVrf_0, biasVrf, 1);
hint(output1)
SetIterations(bs, args->outDim);
SetCols(bs, args->hiddenDim1);
v_rd(bs, ISA_Mem_MvmInitialVrf, ivrf);
mrf += args->hiddenDim1 * args->hiddenDim1;
mv_mul_inc(bs, 0, mrf, 0, args->hiddenDim1);
vv_add_inc(bs, ISA_Mem_AddSubVrf_0, biasVrf, 1);
v_relu(bs);
v_wr(bs, ISA_Mem_NetOutputQ, DONTCARE);
end_chain(bs);
```

Table 5 below includes example concordance conversion code 526. Concordance conversion code 526 may include: (1) instructions for parsing firmware NNP code 522, and (2) instruction handlers for implementing operations associated with the firmware neural network processor.

TABLE 5

```
from collections import deque
import numpy as np
import math
import tensorflow as tf
from emu import FirmwareISA
# helper functions.
def splitter(a, r, c):
    lenr = a.shape[0]//r
    lenc = a.shape[1]//c
    return np.array([a[i*r:(i+1)*r,j*c:(j+1)*c][0] for (i,j) in
np.ndindex(lenr,lenc)]).reshape(lenr,lenc,r,c)
# def split2(a,n=N):
#   return a.reshape( )
N = 1 # native vector size
input_dim = 50
hidden_1 = 40
hidden_2 = 30
output_dim = 20
inDim = math.ceil(input_dim/N) #110
hiddenDim1 = math.ceil(hidden_1/N) #100
hiddenDim2 = math.ceil(hidden_2/N) #90
outDim = math.ceil(output_dim/N) #80
# Memory organization:
bias1 = hiddenDim1 * [np.random.rand(1,N).astype('f')]
inputs = inDim * [np.random.rand(1,N).astype('f')]
bias2 = hiddenDim2 * [np.random.rand(1,N).astype('f')]
bias3 = outDim * [np.random.rand(1,N).astype('f')]
network =+ bias1, inputs, bias2, bias3 ]
NetInputQ = deque( )
for items in network:
    for i in items:
        NetInputQ.extend(i)
NetOutputQ = deque( )
AddSubVrf_0 = deque( )
AddSubVrf_1 = deque( )
# w0 = [ splitter( np.random.rand(input_dim,hidden_1).astype('f'),N,N
).reshape(input_dim*hidden_1,N,N), splitter(
np.random.rand(hidden_1,hidden_2).astype('f'),N,N
).reshape(hidden_1*hidden_2,N,N), splitter(
np.random.rand(hidden_2,output_dim).astype('f'),N,N
).reshape(hidden_2*output_dim,N,N) ]
w = [ np.random.rand(N,N).astype('f'), np.random.rand(N,N).astype('f'),
np.random.rand(N,N).astype('f'), np.random.rand(N,N).astype('f'),
np.random.rand(N,N).astype('f'),
    np.random.rand(N,N).astype('f'), np.random.rand(N,N).astype('f'),
np.random.rand(N,N).astype('f'), np.random.rand(N,N).astype('f'),
np.random.rand(N,N).astype('f'),
    np.random.rand(N,N).astype('f'), np.random.rand(N,N).astype('f'),
np.random.rand(N,N).astype('f'), np.random.rand(N,N).astype('f'),
np.random.rand(N,N).astype('f'),
    np.random.rand(N,N).astype('f'),
    np.random.rand(N,N).astype('f'), np.random.rand(N,N).astype('f'),
np.random.rand(N,N).astype('f'), np.random.rand(N,N).astype('f'),
    np.random.rand(N,N).astype('f'),
    #
    np.random.rand(N,N).astype('f'), np.random.rand(N,N).astype('f'),
np.random.rand(N,N).astype('f'), np.random.rand(N,N).astype('f'),
    np.random.rand(N,N).astype('f'), np.random.rand(N,N).astype('f'),
np.random.rand(N,N).astype('f'), np.random.rand(N,N).astype('f'),
    np.random.rand(N,N).astype('f'), np.random.rand(N,N).astype('f'),
    #
    np.random.rand(N,N).astype('f'), np.random.rand(N,N).astype('f'),
np.random.rand(N,N).astype('f'),
    np.random.rand(N,N).astype('f'), np.random.rand(N,N).astype('f'),
np.random.rand(N,N).astype('f')+
MvmInitialVrf = deque( )
for weights in w:
    MvmInitialVrf.extend(weights)
def nfuv4( ):
    c = '-'
    line = '#' + c*60 , short = '#' + c*30
    isa = FirmwareISA( )
    # get biases 1
    for i in range(hiddenDim1): # this is setcols(hiddenDim)
        isa.v_rd('vec{}'.format(i),'NetInputQ','DC')
        isa.v_wr('vec{}'.format(i), 'AddSubVrf_0', 'bias1_{}'.format(i))
```

TABLE 5-continued

```
    print(line)
#get inputs
for i in range(inDim):
    isa.v_rd('inp{}'.format(i) ,'NetInputQ', 'DC')
    isa.v_wr('inp{}'.format(i), 'MvmInitialVrf, 'inputnode_{}'.format(i),
'ph')
    print(line)
    # layer 1:
    for i in range(hiddenDim1):
        for j in range(inDim):
            isa.v_rd('pass','pass','pass') # reads vector
isa.mv_mul('mv1_{}_{}'.format(i,j),'inputnode_{}'.format(j),
'MvmInitialVrf','w1_{}_
{}'.format(i,j),acc='mv1_{}_{}'.format(i,j-1)) if j>0 else
isa.mv_mul('mv1_{}_{}'.format(i,j),'inputnode_{}'.format(j),
'MvmInitialVrf','w1_{}_
{}'.format(i,j))
            isa.vv_add('vsum1_{}_{}'.format(i,inDim-1),'mv1_{}_{}'.
format(i,inDim-
1),'bias1_{}'.format(i))
            isa.v_relu('hidlayer1_{}_{}'.format(i,j),Vsum1_{}_{}'.format(i,j))
            print(short)
    print(line)
    for i in range(outDim):
        isa.v_rd('vec{}'.format(i),'NetInputQ','DC')
        isa.v_wr('vec{}'.format(i), 'AddSubVrf_0', 'bias2_{}'.format(i))
    print(line)
    print('# layer2')
    print(line)
    #layer 2:
    for i in range(outDim):
        for j in range(hiddenDim1):
            isa.v_rd('pass','pass','pass') # reads vector
isa.mv_mul('mv2_{}_{}'.format(i,j),'hidlayer1_{}_{}'.format
(j,hiddenDim1),'MvmIni
tialVif,'w2_{}_{}'.format(i,j),acc='mv2_{}_{}'.format(i,j-1)) if j>0 else
isa.mv_mul('mv2_{}_{}'.format(i,j),'hidlayer1_{}_{}'.format
(j,hiddenDim1),'MvmIni
tialVif,'w2_{}_{}'.format(i,j))
            isa.vv_add('vsum2_{}_{}'.format(i,hiddenDim1-
1),'mv2_{}_{}'.format(i,hiddenDim1-1),'bias2_{}'.format(i))
            isa.v_relu('outlayer_{}_{}'.format(i,j),vsum2_{}_{}'.format(i,j))
            print(short)
# raise('')
def gennfuv4( ):
    vec0 = NetInputQ.popleft( )
    AddSubVrf_0.append(vec0)
    bias1_0 = tf.Variable(AddSubVrf_0.popleft( ), name="bias1_0")
    vec1 = NetInputQ.popleft( )
    AddSubVrf_0.append(vec1)
    bias1_1 = tf.Variable(AddSubVrf_0.popleft( ), name="bias1_1")
    vec2 = NetInputQ.popleft( )
    AddSubVrf_0.append(vec2)
    bias1_2 = tf.Variable(AddSubVrf_0.popleft( ), name="bias1_2")
    vec3 = NetInputQ.popleft( )
    AddSubVrf_0.append(vec3)
    bias1_3 = tf.Variable(AddSubVrf_0.popleft( ), name="bias1_3")
exec(open('emu0-2.py')'read( ))
```

In addition, data manipulation functions for handling differences in how the data is processed by neural network processor 300 and another processor may be required. As an example, data manipulation functions may be used to convert matrices having dimensions that are native to neural network processor 300 to data that is suitable for consumption by the software instructions corresponding to another processor. In one example, this may include zero padding the data to make the data organized in native dimension format to a format suitable for the software instructions (e.g., TensorFlow instructions).

Table 6 below shows example code for dataset preparation.

TABLE 6

```
import tensorflow as tf
import numpy as np
import math
def onehot(a, depth):
    alen = len(a)
    b = np.zeros((alen, depth))
    b[np.arange(alen), a] = 1
    return b
def pad_along_axis(a, target_length,axis=0):
    pad_size = target_length - a.shape[axis]
    axis_nb = len(a.shape)
    if pad_size < 0:
        return a
    npad = [(0,0) for _ in range(axis_nb)]
    npad[axis] = (0, pad_size)
    b = np.pad(a, pad_width=npad, mode='constant',constant_values=0)
    return b
def get_zero_padded_mnist(native_dim):
    mnist = tf.keras.datasets.mnist
    (x_train, y_train),(x_test, y_test) = mnist.load_data( )
    in_pad_to = math.ceil(n_input/native_dim)* native_dim
    out_pad_to = math.ceil(n_output/native_dim)* native_dim
    new_x_train = pad_along_axis( (x_train/255.0).reshape((-1,n_input)),
in_pad_to, axis=1 ).reshape((x_train.shape[0],-1,native_dim,1))
    new_x_test = pad_along_axis( (x_test/255.0).reshape((-1,n_input)),
in_pad_to, axis=1 ).reshape((x_test.shape[0],-1,native_dim,1))
    new_y_train = pad_along_axis( onehot(y_train, n_output), out_pad_to,
axis=1 )
    new_y_test = pad_along_axis( onehot(y_test, n_output), out_pad_to,
axis=1
)
    return new_x_train, new_y_train, new_x_test, new_y_test
def
get_weights_biases(native_dim=128,zeropadded=True,metaname=
'mnist_sav
es/mnistkeep.meta',ckpt_dir='./mnist_saves'):
    """Note: to get the vars without the names:
    v = tf.trainable_variables( )
    sess.run(v)
    """
    with tf.Session( ) as sess:
        new_saver = tf.train.import_meta_graph(metaname)
        new_saver.restore(sess, tf.train.latest_checkpoint(ckpt_dir))
        loadw1 = sass. run('w1:0')
        loadw2 = sess.run('w2:0')
        loadw3 = sess.run('w3:0')
        loadbias1 = sess.run('bias1 :0')
        loadbias2 = sess.run('bias2:0')
        loadbias3 = sess.run('bias3:0')
        if not zeropadded:
            return loadw1, loadw2, loadw3, loadbias1, loadbias2, loadbias3
        if zeropadded:
            x1 ,y1 = loadw1.shape
            pad_w1_x = math.ceil(x1/native_dim)* native_dim
            pad_w1_y = math.ceil(y1/native_dim)* native_dim
            x2,y2 = loadw2.shape
            pad_w2_x = math.ceil(x2/native_dim)* native_dim
            pad_w2_y = math.ceil(y2/native_dim)* native_dim
            x3,y3 = loadw3.shape
            pad_w3_x = math.ceil(x3/native_dim)* native_dim
            pad_w3_y = math.ceil(y3/native_dim)* native_dim
            w1 = pad_along_axis( pad_along_axis(loadw1, pad_w1_x, axis=0),
pad_w1_y, axis=1)
            w2 = pad_along_axis( pad_along_axis(loadw2, pad_w2_x, axis=0),
pad_w2_y, axis=1)
            w3 = pad_along_axis( pad_along_axis(loadw3, pad_w3_x, axis=0),
pad_w3_y, axis=1)
            bias1 = pad_along_axis(loadbias1, pad_w1_y, axis=0).reshape
((-1,1))
            bias2 = pad_along_axis(loadbias2, pad_w2_y, axis=0).reshape
((-1,1))
            bias3 = pad_along_axis(loadbias3, pad_w3_y, axis=0).reshape
((-1,1))
            return w1, w2, w3, bias1, bias2, bias3
if __name__=="__main__":
    # print('Dataset file.')
```

TABLE 6-continued

```
trin, trout, tin, tout = get_zero_padded_mnist( )
w1 , w2, w3, bias1, bias2, bias3 = get_weights_biases( )
# x_train, y_train, x_test, y_test = get_zero_padded_mnist( )
# dataset1 = tf.data.Dataset.from_tensor_slices(a,b)
```

Table 7 below shows on example of software neural network processing (NNP) code 524. This example shows code for TensorFlow.

TABLE 7

```
inp0 = NetInputQ.popleft( )
MvmInitialVrf.append(inp0)
inputnode_0 = tf.placeholder("float",[1, int(MvmInitialVrf.popleft( ).shape[-1])])
inp1 = NetInputQ.popleft( )
MvmInitialVrf.append(inp1)
inputnode_1 = tf.placeholder("float",[1, int(MvmInitialVrf.popleft( ).shape[-1])])
inp2 = NetInputQ.popleft( )
MvmInitialVrf.append(inp2)
inputnode_2 = tf.placeholder("float",[1, int(MvmInitialVrf.popleft( ).shape[-1])])
inp3 = NetInputQ.popleft( )
MvmInitialVrf.append(inp3)
inputnode_3 = tf.placeholder("float",[1, int(MvmInitialVrf.popleft( ).shape[-1])])
inp4 = NetInputQ.popleft( )
MvmInitialVrf.append(inp4)
inputnode_4 = tf.placeholder("float",[1, int(MvmInitialVrf.popleft( ).shape[-1])])
# ----------------------------------------------------
w1_0_0 = tf.Variable(MvmInitialVrf.popleft( ),name="mv1_0_0")
mv1_0_0 = tf.matmul(w1_0_0,inputnode_0)
w1_0_1 = tf.Variable(MvmInitialVrf.popleft( ),name="mv1_0_1")
mv1_0_1 = tf.add(tf.matmul(w1_0_1,inputnode_1),mv1_0_0)
w1_0_2 = tf.Variable(MvmInitialVrf.popleft( ),name="mv1_0_2")
mv1_0_2 = tf.add(tf.matmul(w1_0_2,inputnode_2),mv1_0_1)
w1_0_3 = tf.Variable(MvmInitialVrf.popleft( ),name="mv1_0_3")
mv1_0_3 = tf.add(tf.matmul(w1_0_3,inputnode_3),mv1_0_2)
w1_0_4 = tf.Variable(MvmInitialVrf.popleft( ),name="mv1_0_4")
mv1_0_4 = tf.add(tf.matmul(w1_0_4,inputnode_4), mv1_0_3)
vsum1_0_4 = tf.add(mv1_0_4,bias1_0,name="vsum1_0_4")
hidlayer1_0_4 = tf.nn.relu(vsum1_0_4,name="hidlayer1_0_4")
# ---------------------
w1_1_0 = tf.Variable(MvmInitialVrf.popleft( ),name="mv1_1_0")
mv1_1_0 = tf.matmul(w1_1_0,inputnode_0)
w1_1_1 = tf.Variable(MvmInitialVrf.popleft( ),name="mv1_1_1")
mv1_1_1 = tf.add(tf.matmul(w1_1_1,inputnode_1), mv1_1_0)
w1_1_2 = tf.Variable(MvmInitialVrf.popleft( ),name="mv1_1_2")
mv1_1_2 = tf.add(tf.matmul(w1_1_2,inputnode_2), mv1_1_1)
w1_1_3 = tf.Variable(MvmInitialVrf.popleft( ),name="mv1_1_3")
mv1_1_3 = tf.add(tf.matmul(w1_1_3,inputnode_3), mv1_1_2)
w1_1_4 = tf.Variable(MvmInitialVrf.popleft( ),name="mv1_1_4")
mv1_1_4 = tf.add(tf.matmul(w1_1_4,inputnode_4), mv1_1_3)
vsum1_1_4 = tf.add(mv1_1_4,bias1_1,name="vsum1_1_4")
hidlayer1_1_4 = tf.nn.relu(vsum1_1_4,name="hidlayer1_1_4")
# ---------------------
w1_2_0 = tf.Variable(MvmInitialVrfpopleft( ),name="mv1_2_0")
mv1_2 _0 = tf.matmul(w1_2_0,inputnode_0)
w1_2_1 = tf.Variable(MvmInitialVrf.popleft( ),name="mv1_2_1")
mv1_2_1 = tf.add(tf.matmul(w1_2_1,inputnode_1), mv1_2_0)
w1_2_2 = tf.Variable(MvmInitialVrf.popleft( ),name="mv1_2_2")
mv1_2_2 = tf.add(tf.matmul(w1_2_2,inputnode_2), mv1_2_1)
w1_2_3 = tf.Variable(MvmInitialVrf.popleft( ),name="mv1_2_3")
mv1_2_3 = tf.add(tf.matmul(w1_2_3,inputnode_3), mv1_2_2)
w1_2_4 = tf.Variable(MvmInitialVrf.popleft( ),name="mv1_2_4")
mv1_2_4 = tf.add(tf.matmul(w1_2_4,inputnode_4), mv1_2_3)
vsum1_2_4 = tf. add(mv1_2_4,bias1_2,name="vsum1_2_4")
hidlayer1_2_4 = tf.nn.relu(vsum1_2_4,name="hidlayer1_2_4")
# ---------------------
w1_3_0 = tf.Variable(MvmInitialVrf.popleft( ),name="mv1_3_0")
mv1_3_0 = tf.matmul(w1_3_0,inputnode_0)
w1_3_1 = tf.Variable(MvmInitialVrf.popleft( ),name="mv1_3_1")
mv1_3_1 = tf.add(tf.matmul(w1_3_1,inputnode_1), mv1_3_0)
w1_3_2 = tf.Variable(MvmInitialVrf.popleft( ),name="mv1_3_2")
mv1_3_2 = tf.add(tf.matmul(w1_3_2,inputnode_2), mv1_3_1)
w1_3_3 = tf.Variable(MvmInitialVrf.popleft( ),name="mv1_3_3")
```

TABLE 7-continued

```
mv1_3_3 = tf.add(tf.matmul(w1_3_3,inputnode_3), mv1_3_2)
w1_3_4 = tf.Variable(MvmInitialVrf.popleft( ),name="mv1_3_4")
mv1_3_4 = tf.add(tf.matmul(w1_3_4,inputnode_4), mv1_3_3)
vsum1_3_4 = tf.add(mv1_3_4,bias1_3,name="vsum1_3_4")
hidlayer1_3_4 = tf.nn.relu(vsum1_3_4,name="hidlayer1_3_4")
assert(tf.gradients(hidlayer1_0_4,w1_0_0)[0] is not None)
assert(tf.gradients(hidlayer1_1_4,w1_1_0)[0] is not None)
assert(tf.gradients(hidlayer1_2_4,w1_2_0)[0] is not None)
assert(tf.gradients(hidlayer1_3_4,w1_3_0)[0] is not None)
# raise('')
# net_out = tf.concat([hidlayer1_0_4,hidlayer1_1_4,hidlayer1_2_4,hidlayer1_3_4],0]
net_out = tf.concat([outlayer_0_3, outlayer_1_3],0)
net_in_verify = tf.concat([inputnode_0,inputnode_1,inputnode_2,inputnode_3, inputnode_4],0,name='net_in_verify')
    W1_verify = tf.concat([
        tf.concat([w1_0_0,w1_0_1,w1_0_2,w1_0_3,w1_0_4],1),
        tf.concat([w1_1_0,w1_1_1,w1_1_2,w1_1_3,w1_1_4],1),
        tf.concat([w1_2_0,w1_2_1,w1_2_2,w1_2_3,w1_2_4],1),
        tf.concat([w1_3_0,w1_3_1,w1_3_2,w1_3_3,w1_3_4],1)
    ],axis=0)
    b1_verify = tf. reshape(tf.concat([bias1_0,bias1_1,bias1_2, bias1_3],0),]-1,1])
    I1_net_out_verify = tf.nn.relu(tf.add(tf.matmul(W1_verify, net_in_verify),
b1_verify))
    W2_verify = tf.concat([
        tf.concat([w2_0_0,w2_0_1,w2_0_2,w2_0_3],1),
        tf.concat([w2_1_0,w2_1_1,w2_1_2,w2_1_3],1),
        # tf.concat([w2_2_0,w2_2_1,w2_2_2,w2_2_3,w2_2_4],1),
        # tf.concat([w1_3_0,w1_3_1,w1_3_2,w1_3_3,w1_3_4],1)
        [,axis=0)
    b2_verify = tf.reshape(tf.concat([bias2_0,bias2_1],0),[-1,1])
    I2_net_out_verify = tf.nn.relu(tf.add(tf.matmul(W2_verify,I1_net_out_verify),
b2_verify))
    # hidlayer1_0_4,hidlayer1_1_4,hidlayer1_2_4,hidlayer1_3_4
    feed_dict = {
        inputnode_1: np.random.sample(1).reshape([-1,1]),
        inputnode_0: np.random.sample(1).reshape([-1,1]),
        inputnode_2: np.random.sample(1).reshape([-1,1]),
        inputnode_3: np.random.sample(1).reshape([-1,1]),
        inputnode_4: np.random.sample(1).reshape([-1,1]),
    }
    sess = tf.Session( )
    sess.run(tf.global_variables_initializer( ))
    [net_out_np, net_out_verify_np] =
sess.run([net_out,I2_net_out_verify]feed_dict=feed_dict)
    assert( np.isclose(net_out_np,net_out_verify_np).min( ) )
```

Although FIG. 5 shows a certain number of components of system 500 arranged in a certain way, additional or fewer components arranged differently may also be used. In addition, although memory 520 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media.

In addition, as described herein the term instructions is not limited to "instructions" expressed in a particular encoding or expression via a particular syntax. As an example, instructions may include state machines or other forms of encodings that can be used to capture operations that the instructions may perform. Thus, in sum, regardless of the expression or the nature of instructions, if a neural network layer is implemented in hardware and quantization operations are involved, then system 500 of FIG. 5 may be used.

Figure 6:
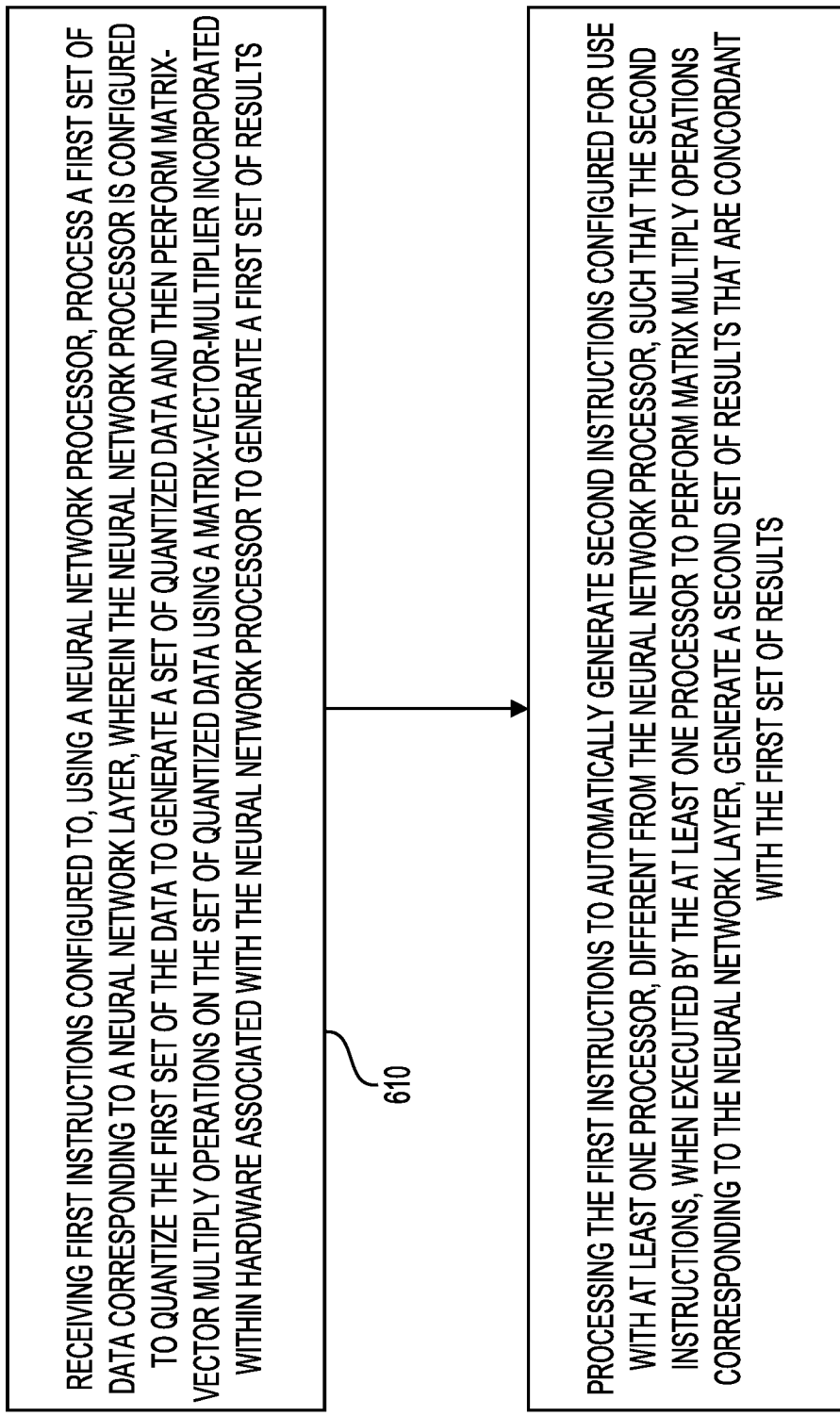
FIG. 6 shows a flow diagram of a method for automatically generating instructions corresponding to a concordant software neural network layer in accordance with one example.

FIG. 6 shows a flow diagram 600 of a method for automatically generating instructions corresponding to a concordant software neural network model in accordance with one example. Step 610 may include receiving first instructions configured to, using a neural network processor, process a first set of data corresponding to a neural network layer, wherein the neural network processor is configured to quantize the first set of the data to generate a set of quantized data and then perform matrix-vector multiply operations on the set of quantized data using a matrix-vector-multiplier incorporated within hardware associated with the neural network processor to generate a first set of results. The first instructions may correspond to firmware NNP code 522 of FIG. 5. These instructions may be received via any of input/output devices 540 or via network interfaces 560. As described earlier, these instructions may be configured to use with neural network processor 300.

Step 620 may include processing the first instructions to automatically generate second instructions configured for use with at least one processor, different from the neural network processor, such that the second instructions, when executed by the at least one processor to perform matrix multiply operations corresponding to the neural network layer, generate a second set of results that are concordant with the first set of results. As part of this step, in one example, concordance conversion code 526 may be executed by processor 510 to process firmware NNP code 522. This processing may result in automatic generation of the second instructions, which may be software NNP code 524 of FIG. 5. Step 620 may include extracting information concerning dependencies between the matrix-vector multiply operations and operations selected from among a softmax operation, a ReLU operation, or an addition operation. Thus, in this example, concordance conversion code 526 may extract the information concerning dependencies among operations. This information, in turn, may be used to generate the second instructions (e.g., software NNP code 524). As an example, the extracted dependencies information may be used to create data flow dependencies as part of software NNP code 524.

Although FIG. 6 describes several steps performed in a certain order, additional or fewer steps may be performed in a different order.

In conclusion, the present disclosure relates to a method including receiving first instructions configured to, using a neural network processor, process a first set of data corresponding to a neural network layer, wherein the neural network processor is configured to quantize the first set of the data to generate a set of quantized data and then perform matrix-vector multiply operations on the set of quantized data using a matrix-vector-multiplier incorporated within hardware associated with the neural network processor to generate a first set of results. The method may further include processing the first instructions to automatically generate second instructions configured for use with at least one processor, different from the neural network processor, such that the second instructions, when executed by the at least one processor to perform matrix multiply operations corresponding to the neural network layer, generate a second set of results that are concordant with the first set of results.

The processing the first instructions to automatically generate second instructions may further comprise extracting information concerning dependencies between the matrix-vector multiply operations and operations selected from among a softmax operation, a ReLU operation, or an addition operation. The processing the first instructions to automatically generate second instructions may comprise transforming a form of the first set of data to another form suitable for use with the second instructions. The set of quantized data may comprise a set of quantized training data for use with operations associated with the second instructions.

The first set of data may be represented in a first precision format having a first precision and the set of quantized data may be represented in a second precision format having a second precision lower than the first precision. The first precision format may comprise floating point format, and the second precision format may comprise a precision format selected from one of an integer format, a reduced floating point precision format, or a block floating point format.

The first set of data may be organized in an N by N matrix form, and where N is an integer greater than 1 and N is a native dimension associated with the matrix-vector-multiplier, and the processing the first instructions to automatically generate the second instructions may comprise transforming the first set of data from the N by N matrix form to another form suitable for use with the second instructions.

In another example, the present disclosure relates to a system including at least one processor and a memory. The memory may include first instructions configured to, using the neural network processor a matrix-vector-multiplier incorporated within hardware associated with the neural network processor and a multi-function unit incorporated with the hardware associated with the neural network processor, process a first set of data corresponding to a neural network layer, wherein the neural network processor is configured to quantize the first set of data to generate a first set of quantized data and then: (1) perform matrix operations on the first set of quantized data, using the matrix-vector-multiplier incorporated within hardware associated with the neural network processor, to generate a first set of output data, (2) quantize the first set of output data to generate a first set of quantized output data, and (3) perform scalar operations, using the multi-function unit incorporated within the hardware associated with the neural network processor, on the first set of quantized output data to generate a second set of output data. The memory may further include second instructions configured to process the first instructions to generate third instructions configured for use with the at least one processor, different from the neural network processor, wherein the third instructions comprise instructions for performing matrix multiply operations and instructions for performing scalar operations to process the neural network layer.

The second instructions may further be configured to extract information concerning dependencies between the matrix-vector multiply operations and operations selected from among a softmax operation, a ReLU operation, or an addition operation. The second instructions may further comprise instructions configured to transform a form of the first set of data to another form suitable for use with the third instructions. The first set of data may be represented in a first precision format having a first precision, and each of the first set of quantized data and the first set of quantized output data may be represented in a second precision format having a second precision lower than the first precision. The first precision format may comprise floating point format, and the second precision format may comprise a precision format selected from one of an integer format, a reduced floating point precision format, or a block floating point format.

The set of quantized data may comprise a set of quantized training data for use with operations associated with the second instructions. The first set of data may be organized in an N by N matrix form, and where N is an integer greater than 1 and N is a native dimension associated with the matrix-vector-multiplier, and the second instructions may further comprise instructions configured to transform the first set of data from the N by N matrix form to another form suitable for use with the third instructions.

In yet another example, the present disclosure relates to a non-transitory computer-readable medium including code corresponding to a method. The method may include receiving first instructions configured to, using a neural network processor, process a first set of data corresponding to a neural network layer, wherein the neural network processor is configured to quantize the first set of the data to generate a set of quantized data and then perform matrix-vector multiply operations on the set of quantized data using a matrix-vector-multiplier incorporated within hardware associated with the neural network processor to generate a first set of results. The method may further include processing the first instructions to automatically generate second instructions configured for use with at least one processor, different from the neural network processor, such that the second instructions, when executed by the at least one processor to perform matrix multiply operations corresponding to the neural network layer, generate a second set of results that are concordant with the first set of results.

The processing the first instructions to automatically generate second instructions may further comprise extracting information concerning dependencies between the matrix-vector multiply operations and operations selected from among a softmax operation, a ReLU operation, or an addition operation. The first set of data may be represented in a first precision format having a first precision and the set of quantized data is represented in a second precision format having a second precision lower than the first precision. The first precision format may comprise floating point format, and the second precision format may comprise a precision format selected from one of an integer format, a reduced floating point precision format, or a block floating point format.

The set of quantized data may comprise a quantized set of training data for use with operations associated with the second instructions. The first set of data may be organized in an N by N matrix form, where N is an integer greater than 1 and N is a native dimension associated with the matrix-vector-multiplier, and the processing the first instructions to automatically generate the second instructions may comprise transforming the first set of data from the N by N matrix form to another form suitable for use with the second instructions.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:
1. A method comprising:
receiving firmware code corresponding to a neural network layer, wherein a neural network processor is configured to quantize a first set of the data to generate a set of quantized data and then perform matrix-vector multiply operations on the set of quantized data using a matrix-vector-multiplier incorporated within hard- ware associated with the neural network processor to generate a first set of results; and using concordance conversion code, converting the firmware code corresponding to the neural network layer into concordant software code configured for use with at least one processor, different from the neural network processor, such that the concordant software code, when executed by the at least one processor to perform matrix multiply operations corresponding to the neural network layer, generate a second set of results that are concordant with the first set of results.

2. The method of claim 1, wherein the converting the firmware code corresponding to the neural network layer into concordant software code further comprises extracting information concerning dependencies between the matrix-vector multiply operations and operations selected from among a softmax operation, a ReLU operation, or an addition operation.

3. The method of claim 1, wherein the first set of data is represented in a first precision format having a first precision and the set of quantized data is represented in a second precision format having a second precision lower than the first precision.

4. The method of claim 3, wherein the first precision format comprises floating point format, and wherein the second precision format comprises a precision format selected from one of an integer format, a reduced floating point precision format, or a block floating point format.

5. The method of claim 1, wherein the set of quantized data comprises a set of quantized training data for use with operations associated with the concordant software code.

6. The method of claim 1, wherein the first set of data is organized in an N by N matrix form, and wherein N is an integer greater than 1 and N is a native dimension associated with the matrix-vector-multiplier, and wherein the converting the firmware code corresponding to the neural network layer into concordant software code comprises transforming the first set of data from the N by N matrix form to another form suitable for se with the concordant software code.

7. The method of claim 1, wherein the converting the firmware code corresponding to the neural network layer into concordant software code comprises transforming a form of the first set of data to another form suitable for use with the concordant software code.

8. A system comprising:
at least one processor; and
a memory comprising:
firmware code corresponding to a neural network layer configured to, using a neural network processor having a matrix-vector-multiplier incorporated within hardware associated with the neural network processor and a multi-function unit incorporated within the hardware associated with the neural network processor, quantize a first set of data to generate a first set of quantized data and then: (1) perform matrix operations on the first set of quantized data, using the matrix-vector-multiplier incorporated within the hardware associated with the neural network processor, to generate a first set of output data, (2) quantize the first set of output data to generate a first set of quantized output data, and (3) perform scalar operations, using the multi-function unit incorporated within the hardware associated with the neural network processor, on the first set of quantized output data to generate a second set of output data; and concordance conversion code configured to process the firmware code to generate concordant software code configured for use with the at least one processor, different from the neural network processor, wherein the concordant software code comprises instructions for performing matrix multiply operations and instructions for performing scalar operations to process the neural network layer.

9. The system of claim 8, wherein the concordance conversion code is further configured to extract information concerning dependencies between the matrix-vector multiply operations and operations selected from among a softmax operation, a ReLU operation, or an addition operation.

10. The system of claim 8, wherein the first set of data is represented in a first precision format having a first precision, and wherein each of the first set of quantized data and the first set of quantized output data is represented in a second precision format having a second precision lower than the first precision.

11. The system of claim 10, wherein the first precision format comprises floating point format, and wherein the second precision format comprises a precision format selected from one of an integer format, a reduced floating point precision format, or a block floating point format.

12. The system of claim 8, wherein the set of quantized data comprises a set of quantized training data for use with operations associated with the concordant software code.

13. The system of claim 8, wherein the first set of data is organized in an N by N matrix form, and wherein N is an integer greater than 1 and N is a native dimension associated with the matrix-vector-multiplier, and wherein the concordance conversion code further comprises instructions configured to transform the first set of data from the N by N matrix form to another form suitable for use with the concordant software code.

14. The system of claim 8, wherein the concordance conversion code further comprises instructions configured to transform a form of the first set of data to another form suitable for use with the concordant software code.

15. A non-transitory computer-readable medium comprising code corresponding to a method, the method comprising:
receiving firmware code corresponding to a neural network layer, wherein a neural network processor is configured to quantize a first set of the data to generate a set of quantized data and then perform matrix-vector multiply operations on the set of quantized data using a matrix-vector-multiplier ncorporated within hardware associated with the neural network processor to generate a first set of results; and using concordance conversion code, converting the firmware code corresponding to the neural network layer into concordant software code configured for use with at least one processor, different from the neural network processor, such that the concordant software code, when executed by the at least one processor to perform matrix multiply operations corresponding to the neural network layer, generate a second set of results that are concordant with the first set of results.

16. The non-transitory computer-readable medium of claim 15, wherein the converting the firmware code corresponding to the neural network layer into concordant software code further comprises extracting information concerning dependencies between the matrix-vector multiply operations and operations selected from among a softmax operation, a ReLU operation, or an addition operation.

17. The non-transitory computer-readable medium of claim 15, wherein the first set of data is represented in a first precision format having a first precision and the set of quantized data is represented in a second precision format having a second precision lower than the first precision.

18. The non-transitory computer-readable medium of claim 17, wherein the first precision format comprises floating point format, and wherein the second precision format comprises a precision format selected from one of an integer format, a reduced floating point precision format, or a block floating point format.

19. The non-transitory computer-readable medium of claim 15, wherein the set of quantized data comprises a quantized set of training data for use with operations associated with the concordant software code.

20. The non-transitory computer-readable medium of claim 15, wherein the first set of data is organized in an N by N matrix form, and wherein N is an integer greater than 1 and N is a native dimension associated with the matrix-vector-multiplier, and wherein the converting the firmware code corresponding to the neural network layer into concordant software code comprises transforming the first set of data from the N by N matrix form to another form suitable for use with the concordant software code.

\* \* \* \* \*